United States Patent
Faggiani et al.

(10) Patent No.: US 12,181,043 B2
(45) Date of Patent: Dec. 31, 2024

(54) HYDROMECHANICAL TRANSMISSION AND WARM-UP METHOD

(71) Applicant: DANA ITALIA S.R.L., Trentino (IT)

(72) Inventors: Giacomo Faggiani, Rovereto (IT); Mario Gelmini, Arco (IT)

(73) Assignee: DANA ITALIA S.R.L., Arco (IT)

( * ) Notice: Subject to any disclaimer, the term of this patent is extended or adjusted under 35 U.S.C. 154(b) by 0 days.

(21) Appl. No.: 18/326,788

(22) Filed: May 31, 2023

(65) Prior Publication Data

US 2023/0304578 A1  Sep. 28, 2023

Related U.S. Application Data (63) Continuation of application No. 17/653,083, filed on Mar. 1, 2022, now Pat. No. 11,703,126.

(60) Provisional application No. 63/169,146, filed on Mar. 31, 2021.

(51) Int. Cl.
  *F16H 63/48* (2006.01)
  *F16H 47/04* (2006.01)

(52) U.S. Cl.
  CPC ............ *F16H 63/48* (2013.01); *F16H 47/04* (2013.01)

(58) Field of Classification Search
  CPC ...... F16H 47/04; F16H 63/48; F16H 61/0059; F16H 61/40; F16H 61/42; F16H 61/427; F16H 61/433

USPC ................................................... 60/487, 435
See application file for complete search history.

(56) References Cited

U.S. PATENT DOCUMENTS

| | | | |
|---|---|---|---|
| 5,115,694 A | 5/1992 | Sasaki et al. | |
| 6,530,855 B1* | 3/2003 | Folsom | F16H 47/04 475/72 |
| 6,641,498 B2 | 11/2003 | Okuwaki | |
| 7,007,782 B2 | 5/2006 | Anwar et al. | |
| 7,670,260 B2 | 3/2010 | DeMarco | |
| 8,406,945 B2 | 5/2013 | Sah et al. | |
| 8,532,887 B2 | 9/2013 | Moriyama et al. | |
| 9,874,279 B1* | 1/2018 | Guo | F16H 61/70 |
| 9,982,779 B2 | 5/2018 | Kinch et al. | |
| 2007/0142168 A1 | 6/2007 | DeMarco | |
| 2016/0281821 A1* | 9/2016 | Matsuura | B60K 17/34 |

FOREIGN PATENT DOCUMENTS

DE  102015208008 A1 * 11/2016

\* cited by examiner

*Primary Examiner* — Timothy Hannon
*Assistant Examiner* — Aimee Tran Nguyen
(74) *Attorney, Agent, or Firm* — McCoy Russell LLP (57) ABSTRACT

Methods and systems for a hydromechanical transmission are provided. In one example, the method includes responsive to rotation of a portion of a mechanical assembly induced by cranking of an engine, blocking an output shaft of the hydromechanical transmission via joint engagement of a forward drive clutch and a reverse drive clutch. The method further includes pressurizing a hydrostatic assembly while the forward drive clutch and the reverse drive clutch remain jointly engaged, where the mechanical assembly is coupled in parallel with the hydrostatic assembly.

15 Claims, 6 Drawing Sheets

HYDROMECHANICAL TRANSMISSION AND WARM-UP METHOD

CROSS REFERENCE TO RELATED APPLICATIONS

The present application is a continuation of U.S. Non-Provisional patent application Ser. No. 17/653,083, entitled "HYDROMECHANICAL TRANSMISSION AND WARM-UP METHOD," and filed on Mar. 1, 2022. U.S. Non-Provisional patent application Ser. No. 17/653,083 claims priority to U.S. Provisional Application No. 63/169,146, entitled "HYDROMECHANICAL TRANSMISSION AND WARM-UP METHOD", and filed on Mar. 31, 2021. The entire contents of the above-listed applications are hereby incorporated by reference for all purposes.

TECHNICAL FIELD

The present disclosure relates to a warm-up procedure for a hydromechanical transmission.

BACKGROUND AND SUMMARY

Hydraulic transmissions, such as hydromechanical variable transmissions (HVTs), rely on hydraulic fluid, such as oil, for many tasks. These tasks may include power vector in the hydrostatic units, control of hydrostatic units and clutches, as well as cooling and lubrication. Certain hydraulic transmissions may be designed to function at a specific oil viscosity or within a desired range of viscosities. For example, some transmission may be operated to maintain the oil temperature around a set-point temperature or within a desired temperature range. When operated outside of the desired temperature range, degradation of gearbox components as well as declines in gearbox performance may occur. The inventors have therefore recognized a desire to more rapidly increase gearbox temperature to avoid component degradation and drops in gearbox performance.

The inventors developed a warm-up method for a hydromechanical transmission to at least partially resolve the abovementioned issues. The hydromechanical transmission includes a mechanical assembly coupled in parallel with a hydrostatic assembly. The warm-up method includes, during engine cranking, blocking an output of the hydromechanical transmission through engagement of a forward drive clutch and a reverse drive clutch in the mechanical assembly. The method further includes, increasing the differential pressure in the hydrostatic assembly via operation of a hydraulic pump based on a hydraulic motor speed reference. In this way, the hydrostatic assembly can be rapidly pressurized to increase hydraulic fluid temperature while clutch operation is coordinated to hold the transmission's output stationary. Therefore, undesired component wear and declines in transmission performance occurring during cold start conditions may be efficiently diminished when compared to previous warm-up strategies.

In one example, the method may further include, prior to blocking the output shaft, operating the hydrostatic assembly in a speed control mode to synchronize the forward drive clutch and the reverse drive clutch. In this way the clutches may be efficiently readied for output shaft blocking.

Still further, in another example, the method may further include subsequent to the warm-up (e.g., in anticipation of vehicle launch) switching the hydrostatic unit from the speed control mode to a torque control mode, subsequent to disengagement of the forward drive clutch and reverse drive clutch. In this way, the transmission may transition between speed and torque control modes to achieve desired performance characteristics during warm-up and launch, for instance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
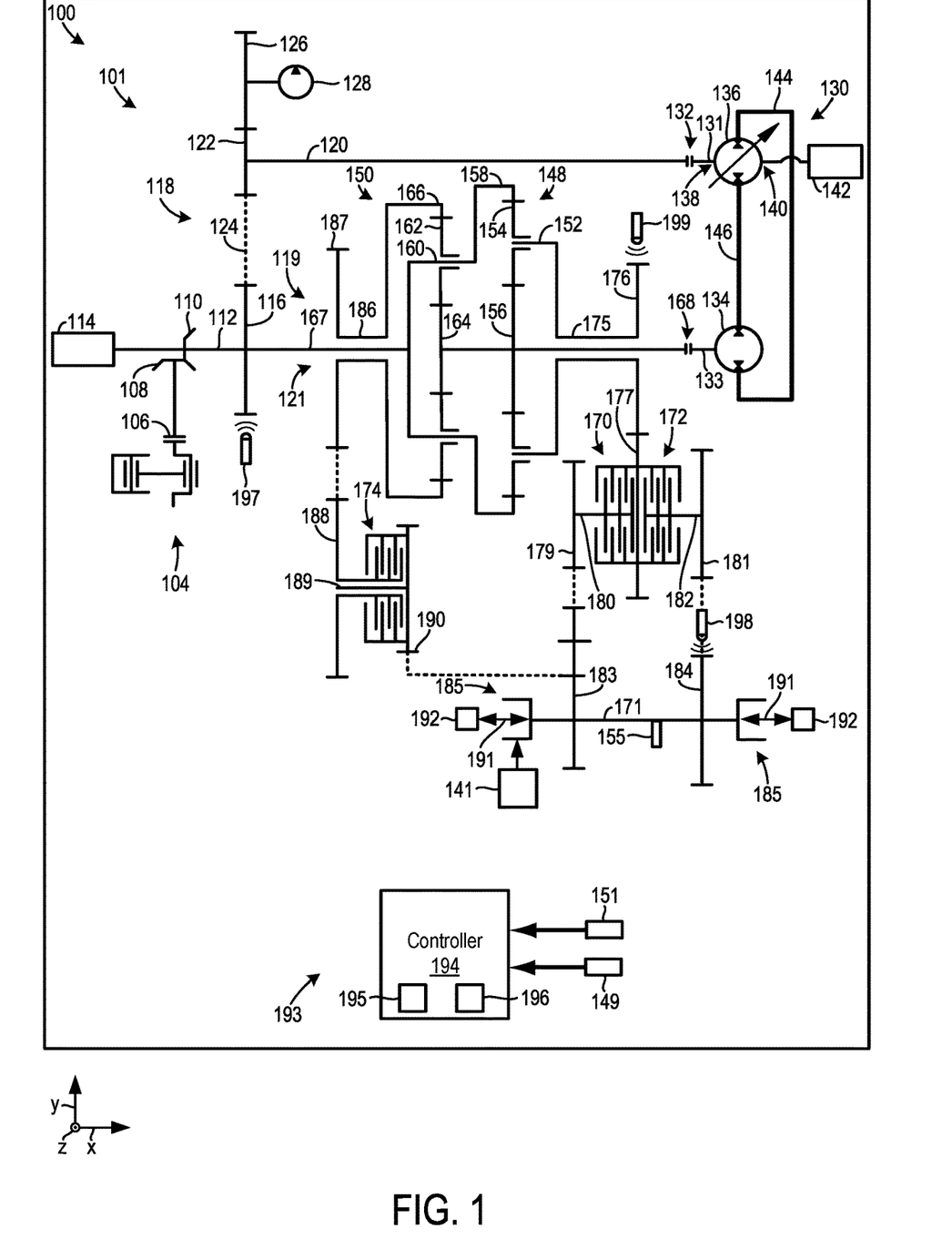
FIG. 1 is a schematic representation of a hydromechanical transmission system in a vehicle.

FIG. 1 shows a schematic depiction of a transmission system 100 with a hydromechanical transmission 101 (e.g., a hydromechanical variable transmission) in a vehicle 102 or other suitable machine platform. In one example, the vehicle may be an off-highway vehicle, although the transmission may be deployed in on-highway vehicles, in other examples. An off-highway vehicle may be a vehicle whose size and/or maximum speed precludes the vehicle from being operated on highways for extended durations. For instance, the vehicle's width may be greater than a highway lane and/or the vehicle top speed may be below the highways maximum allowable speed, for example. Industries and their corresponding operating environments in which the vehicle may be deployed include forestry, mining, agriculture, etc. In either case, the vehicle may be designed with auxiliary systems driven by hydraulic and/or mechanical power take-offs (PTOs).

The transmission system 100 may function as an infinitely variable transmission (IVT) where the transmission's gear ratio is controlled continuously from a negative maximum speed to a positive maximum speed with an infinite number of ratio points. In this way, the transmission can achieve a comparatively high level of adaptability and efficiency when compared to transmission which operate in discrete ratios.

The transmission system 100 may have asymmetric maximum output speeds for forward and reverse direction. This forward-reverse speed asymmetry may enable the transmission to achieve a desired breadth of speed ranges. However, other suitable output speed variations have been contemplated, such as symmetric output speeds in the forward and reverse directions, which may however, increase system complexity through the use of an additional clutch.

The transmission system 100 may include or receive power from a motive power source 104 such as an engine, an electric motor (e.g., an electric motor generator), combinations thereof, and the like. As such, in one example, both and internal combustion engine and an electric motor may be rotationally coupled to the transmission system 100 in a hybrid configuration. In other examples, the vehicle may be a battery electric vehicle (BEV) where the power source for the transmission is an electric motor-generator.

A power source disconnect clutch 106 may be further provided in the transmission. The disconnect clutch 106 is configured to couple and decouple the power source 104 from the transmission. The disconnect clutch 106, as well as the other disconnect clutches described herein, may be dog clutches, in one example, or friction clutches, in other examples. Gears 108, 110, such as bevel gears, may be used to rotationally couple the power source 104 to an input shaft 112. As described herein, a gear may be a mechanical component which rotates and includes teeth that are profiled to mesh with teeth in one or more corresponding gears to form a mechanical connection that allows rotational energy transfer therethrough.

A mechanical PTO 114 may be coupled to the input shaft 112. The mechanical PTO 114 may drive an auxiliary system such as a pump (e.g., a hydraulic pump, a pneumatic pump, and the like), a winch, a boom, a bed raising assembly, and the like. To accomplish the power transfer to auxiliary components, the PTO may include an interface, shaft(s), housing, and the like. However, in other examples, the PTO and/or the disconnect clutch may be omitted from the transmission system. A gear 116 may be coupled to the input shaft 112. A mechanical assembly 118 is further included in the transmission system 100. The mechanical assembly 118 may include the shaft 112 and/or the gear 116 as well as shaft 167, described in greater detail herein. Further, the transmission may include a shaft 120 and a gear 122 rotationally coupled to the gear 116 on the input shaft 112. Dashed line 124 and the other dashed lines depicted in FIG. 1 indicate a mechanical connection between components which facilitates rotational energy transfer therebetween.

A gear 126 meshing with gear 122 may be rotationally attached to a charging pump 128. The charging pump 128 may be designed to deliver pressurized fluid to hydraulic components in the transmission such as a hydraulic motor 134 (e.g., hydrostatic motor), a hydraulic pump 136 (e.g., hydrostatic pump), and the like. The fluid pressurized by the charging pump may additionally be used for clutch actuator and/or transmission lubrication. The charging pump may include a piston, a rotor, a housing, chamber(s), and the like to allow the pump to move fluid. The mechanical assembly 118 is rotationally coupled in parallel to a hydrostatic assembly 130 (e.g., a hydrostatic unit). Further, the hydrostatic assembly 130 may have a U-shape design where the shafts 131, 133 serve as a mechanical interface for the hydraulic pump 136 (e.g., variable displacement pump) and the hydraulic motor 134 (e.g., fixed bent axis motor), respectively, are parallel to one another and arranged on one side of the assembly. This U-shaped layout permits the hydrostatic assembly's size to be reduced and enables the use of high pressure hoses to be forgone to reduce manufacturing costs as well the chance of hydrostatic unit degradation, if desired. Still further, the hydrostatic assembly 130 may be arranged on an opposite side of the transmission as the charging pump 128 and/or axially offset from clutches 170, 172. Arranging the hydrostatic assembly in this manner permits the width and length of the transmission to be reduced and allows the installation of the transmission in the vehicle to be simplified. Further, the motor and the pump in the hydrostatic assembly may be enclosed a common housing to increase transmission compactness.

The mechanical assembly 118 is rotationally coupled in parallel to a hydrostatic assembly 130. The coupling of the hydrostatic assembly to the mechanical assembly enables the transmission to achieve power split functionality in which power may synchronously flow through either path to additively combine or recirculate power through the system. This power split arrangement allows the transmission's power flow to be highly adaptable to increase efficiency over a wide range of operating conditions. Thus, the transmission may be a full power split transmission, in one example.

The mechanical assembly 118 may include multiple mechanical paths that are coupled in parallel to the hydrostatic assembly. To elaborate, the shaft 167 may serve as a junction for a first mechanical path (e.g., branch) 119 and a second mechanical path (e.g., branch) 121. To elaborate, the first mechanical path 119 may provide rotational energy transfer capabilities from an interface of the hydrostatic assembly 130 to a ring gear 158 of a first planetary gearset 148, during certain operating conditions. Additionally, the second mechanical path 121 may provide rotational energy transfer capabilities from the interface of the hydrostatic assembly 130 to a carrier 160 of a second planetary gearset 150. Arranging the mechanical paths in this manner may allow the transmission to efficiently achieve a desired range of gear ratios.

A disconnect clutch 132 may be arranged between the hydrostatic assembly 130 and the shaft 120. The disconnect clutch 132 is configured to rotationally couple and decouple the mechanical assembly 118 from the hydrostatic assembly 130. To elaborate, the disconnect clutch may be a dog clutch, in one example.

The hydrostatic assembly 130 includes a hydraulic motor 134 (e.g., hydrostatic motor) and a hydraulic pump 136 (e.g., hydrostatic pump). Further, the hydraulic pump 136 may include a first mechanical interface 138 and a second mechanical interface 140. The first mechanical interface 138 may be rotationally coupled to the disconnect clutch 132 and the second mechanical interface 140 may be rotationally coupled to another mechanical PTO 142. Again, the mechanical PTO may be used to drive an auxiliary vehicle system such as an air compressor, a mechanical arm or boom, an auger, etc. In this way, the transmission may be adapted for a variety of end-use operating environments. Specifically, providing multiple PTOs, in the arrangement depicted in FIG. 1, enables the transmission system to meet end-use design goals in a variety of different types of vehicles, if wanted. As such, the system's applicability is expanded and the customer appeal of the transmission is increased.

The hydraulic pump 136 may be a variable displacement bi-directional pump, in one example. Specifically, the pump may be an axial piston pump, in one instance. To elaborate, the axial piston pump may include a swash plate that interacts with pistons and cylinders to alter the pump's displacement via a change in swivel angle, in one specific example. However, other suitable types of variable displacement bi-directional pumps have been contemplated.

The hydraulic motor 134 may be a fixed displacement bi-directional motor (e.g., fixed bent axis motor). The fixed bent axis motor is relatively compact when compared to variable displacement motors. The system can therefore achieve greater space efficiency and pose less space constraints on other systems in the vehicle, if desired. However, alternate types of pumps and/or motors may be used, if motor adjustability is favored at the expense of compactness. For instance, the hydraulic motor may be a variable displacement motor.

Hydraulic lines 144, 146 are attached to hydraulic interfaces in each of the motor and pump to enable the hydrostatic assembly to provide additive and power circulation functionality with regard to the mechanical branches arranged in parallel with the hydrostatic assembly 130. For example, in an additive power mode, power from both the hydrostatic and mechanical assemblies is combined at one of the planetary gearsets and delivered to the transmission output. In a power split mode, power is recirculated through the hydrostatic assembly. Therefore, the hydraulic pump 136 and the hydraulic motor 134 may be operated to flow power to the sun gears of either planetary assembly from the hydraulic motor, during certain conditions. Conversely, during other conditions, the hydraulic pump 136 and the hydraulic motor 134 may be operated to flow power back to the gearset and the mechanical branches.

The transmission system 100 further includes the first planetary gearset 148 and the second planetary gearset 150. The first planetary gearset 148 may include a carrier 152 on which planet gears 154 rotate. The planet gears 154 may mesh with a sun gear 156 and the ring gear 158. Likewise, the second planetary gearset 150 may include the carrier 160, planet gears 162, a sun gear 164, and a ring gear 166. Therefore, the second planetary gearset 150 may again be a simple planetary gear. Further, bearings arranged between the planet gears and the carrier in each planetary arrangement may facilitate rotation thereof. The sun gears and/or shafts to which they are attached may further have bearings coupled thereto. The bearings may be roller bearings (e.g., needle roller bearings), ball bearings, or other suitable types of bearings that enable component rotation while constraining other relative motions.

The carrier 160 of the second planetary gearset 150 may be rotationally coupled to the ring gear 158 of the first planetary gearset 148. Further, the carrier 160 of the second planetary gearset 150 may be rotationally coupled to a shaft 167. The shaft 167 may extend through a central opening in an extension 186, described in greater detail herein. This rotational attachment scheme may be conceptually described as a formation of mechanical branches attached in parallel to the hydrostatic assembly 130.

As described herein a parallel attachment between components, assemblies, etc., denotes that the input and output of the two components or grouping of components are rotationally coupled to one another. This parallel arrangement allows power to recirculate through the hydrostatic assembly, during some conditions, or be additively combined from the mechanical and hydrostatic branches, during other conditions. As a result, the transmission's adaptability is increased.

The sun gears 156, 164 of the first and second planetary gearsets 148, 150 may be rotationally coupled (e.g., directly attached) to one another. Attaching the sun gears in this manner may enable the transmission to achieve a desired gear ratio, compactness, and efficiency.

The hydraulic motor 134 may be rotationally coupled to the sun gear 156 via another disconnect clutch 168 that is designed to rotationally connect and disconnect the motor from the planetary gearset 148. The disconnect clutch may be a dog type clutch which uses an interference fit between component for clutch engagement, in one example. However, in an alternate example, the disconnect clutch may be another suitable type of clutch, such as a friction clutch.

The transmission system 100 further includes a reverse clutch 170, a first forward drive clutch 172, and a second forward drive clutch 174. More generally, the first forward drive clutch may be referred to as a first clutch or a first forward clutch, the reverse drive clutch may be referred to as a second clutch or reverse clutch and the second forward drive clutch may be referred to as a third clutch or a second forward clutch. Further, the first forward drive clutch 172 and the reverse clutch 170 may be coaxially arranged.

The clutches 170, 172, 174 may be friction clutches that each include plates, spacers, and the like. These clutch plates may rotate about a common axis and are designed to engage and disengage one another to facilitate selective power transfer to downstream components. In this way, the clutches may be closed and opened to place them in engaged and disengaged states. In the disengaged state, power does not pass through the clutch. Conversely in the engaged state, power travels through the clutch during transmission operation. Further, the clutches may be hydraulically, electromagnetically, and/or pneumatically actuated. For instance, the clutches may be adjusted via a hydraulic piston. The adjustability may be continuous, in one example, where the clutch may be transition through partially engaged states to a fully engaged state, where a relatively small amount of power loss occurs in the clutch. However, in other examples, the clutches may be discretely adjusted.

The carrier 152 may include an extension 175 with a gear 176 that meshes with a gear 177. The gear 177, in the illustrated example, is rotationally coupled to the reverse clutch 170 and the first forward clutch 172. The reverse clutch 170 and the first forward clutch 172 are shown arranged adjacent to one another and may share a common rotational axis. Because of this proximal clutch arrangement, the system may exhibit greater compactness which poses less space constraints on adjoining vehicle systems. Alternatively, the reverse clutch may be spaced away from the first forward clutch which may, however, decrease system compactness.

A gear 179 may reside on an output shaft 180 of the reverse clutch 170. Likewise, a gear 181 may reside on an output shaft 182 of the first forward clutch 172. Both gears 179, 181 may be rotationally attached to a system output shaft 171 via gears 183, 184 respectively. In this way, both the reverse clutch and the first forward clutch deliver power to the transmission's output, during different operating conditions.

The system output shaft 171 may include one or more interfaces 185 (e.g., yokes, gears, chains, combinations thereof, and the like). The output shaft is specifically illustrated with two outputs. However, the transmission may include an alternate numbers of outputs. The gear 179 is rotationally coupled to the output shaft via meshing with gear 183. Arrows 191 depict the flow of power from the transmission system to drive axles 192 and/or other suitable downstream vehicle components or vice versa. A driveline with a shaft, joints, and the like may be used to carry out the power transfer between the transmission and the axles. It will be understood that the drive axles may include drive wheels.

A parking brake mechanism 141 designed to engage and disengage the output interfaces 185 may further be included in the hydromechanical transmission 101. The parking brake mechanism 141 may include calipers, drums, and other suitable components for the prevention of rotation of the transmission's output. The parking brake mechanism 141 may be mechanically and/or hydraulically actuated.

The ring gear 166 of the second planetary gearset 150 may include the extension 186 with a gear 187 position thereon. The gear 187 may be rotationally attached to a gear 188 in the second forward clutch 174, as indicated via a dashed line. The gear 188 may be coupled to a first set of plates in the clutch 174. A second set of plates in the clutch may be attached to an output shaft 189 and a gear 190. The gear 190 may be rotationally coupled to the gear 183, as indicated by a dashed line. Due to the arrangement of the clutches and the planetary gearsets, the transmission system 100 achieves a higher efficiency and enhanced drivability, comfort, and productivity than previous hydromechanical transmissions.

The transmission system 100 may additionally include a lubrication system and hydraulic control system which may include a sump. This lubrication system may further include conventional components for lubricating the gears and/or the clutches such as pumps, conduits, valves, and the like.

A control system 193 with a controller 194 may further be incorporated in the transmission system 100. The controller 194 includes a processor 195 and memory 196. The memory 196 may hold instructions stored therein that when executed by the processor cause the controller 194 to perform the various methods, control strategies, etc., described herein. The processor 195 may include a microprocessor unit and/or other types of circuits. The memory 196 may include known data storage mediums such as random access memory, read only memory, keep alive memory, combinations thereof, etc.

The controller 194 may receive vehicle data and various signals from sensors positioned in different locations in the transmission system 100 and/or the vehicle 102. The sensors may include gear speed sensors 197, 198, 199 which detect the speed of gear 116, gear 184, and gear 176, respectively. In this way, gear speed at the input and the output of the system may be detected along with the gear speed at the output of the first planetary gearset 148. However, in other examples, the speeds of at least a portion of the gears may be modeled by the controller. The vehicle may further include a torque sensor 155. Alternatively, the torque and/or speed of the output shaft may be modeled.

The controller 194 may send control signals to an actuator in the hydraulic pump 136 or an actuation system coupled to the pump to adjust the pump's output and/or direction of hydraulic fluid flow. Additionally, the clutches 170, 172, 174 may receive commands (e.g., opening or closing commands) from the controller and actuators in the clutches or actuation systems coupled to the clutches may adjust the state of the clutch in response to receiving the command. For instance, the clutches may be actuated via hydraulically controlled pistons, although other suitable clutch actuators have been envisioned. The other controllable components in the transmissions system include the hydraulic motor 134, the clutch 106, the clutch 132, the clutch 168, the motive power source 104, and the like. These controllable components may function similarly with regard to receiving control commands and adjusting an output and/or a state of a component responsive to receiving the command via an actuator. Additionally or alternatively, a vehicle electronic control unit (ECU) may be provided in the vehicle to control the power source (e.g., engine and/or motor). Furthermore, the control system 193 and specifically the controller 194 with the memory 196 and processor 195 may be configured to carry out the warm-up strategy expanded upon herein with regard to FIGS. 4-8.

The transmission system 100 may include input devices 149, 151 (e.g., a drive-input device (e.g., drive pedal), brake-input device (e.g., brake pedal), gear selector, and the like). The input device 151, responsive to driver input, may generate a power request. Further, the transmission system may automatically switch between drive modes when demanded. To elaborate, the operator may request a forward or reverse drive mode speed change, and the transmission may increase speed and automatically transition between the drive ranges associated with the different drive modes, when needed. Further, in one example, the operate may request reverse drive operation while the vehicle is operating in a forward drive mode. In such an example, the transmission may automatically initiate a shift (e.g., synchronous shift) between the forward and reverse drive modes. In this way, the operator may more efficiently control the vehicle, in comparison to transmissions designed for manual drive mode adjustment. However, in other examples, the system may be designed to allow the vehicle operator to manually request a mode change between the forward drive ranges, for instance. It will further be appreciated, that the power source may be controlled in tandem with the transmission. For instance, when power request requested is received by the controller, the power source's output speed may be correspondingly increased.

The hydromechanical transmission 101 shown in FIG. 1 may be operated in different drive ranges (e.g., a reverse drive range, a first forward drive range, and a second forward drive range). In each of the drive ranges power flow through the hydrostatic assembly may be additive or circulatory to provide continuous range adjustment. To elaborate, the pump's displacement may be adjusted within each drive range to achieve different speed ratios. Specifically, in one example, the first forward drive range may be entered by engaging the first forward drive clutch 172 and disengaging and/or sustaining disengagement of the other clutches 170, 174. Entry into the other drive ranges may occur in a similar manner. For instance, the second forward drive range may be implemented by engaging the second forward drive clutch 174 and disengaging and/or sustaining disengagement of the clutches 170, 172. Further, the hydromechanical transmission 101 may be placed in a blocked condition by simultaneously engaging the first forward drive clutch 172 and the reverse clutch 170. Specifically, in one example, if the transmission output speed is null and the hydrostatic pump displacement is approaching an upper displacement (e.g., maximum displacement) then both the first forward clutch and the reverse clutch differential speeds are approximately zero and can therefore be closed for clutch blocking.

An axis system with an x-axis, y-axis, and z-axis is provided in FIGS. 1 and 4-8. The x-axis may be a lateral axis, the y-axis may be a longitudinal axis, and the z-axis may be parallel to a gravitational axis, although numerous orientations of the axes are possible.

Figure 2:
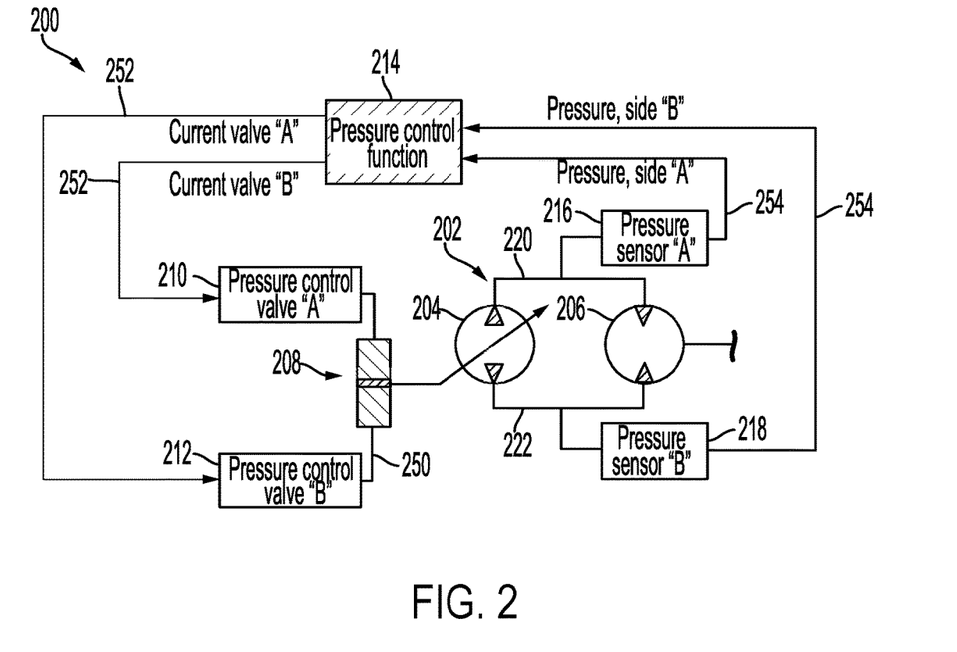
FIGS. 2 and 3 are examples of control systems for a hydrostatic assembly in a hydromechanical transmission.

FIG. 2 shows a control system 200 for a hydrostatic assembly 202 with a hydraulic pump 204 and a hydraulic motor 206. The hydrostatic assembly 202 is an example of the hydrostatic assembly 130, depicted in FIG. 1, and redundant description is therefore omitted for concision.

A hydraulic control piston 208 that is designed to control the swash plate angle of the hydraulic pump 204 is further included in the control system 200. A first pressure control valve 210 and a second pressure control valve 212 are in fluidic communication with the hydraulic control piston 208. Specifically, the pressure control valves are in fluidic communication with chambers on opposing sides of the piston. As such, varying the pressure in the chambers changes the piston's position. Further, adjustment of the hydraulic control piston 208 alters the swash plate angle of the hydraulic pump 204. Lines 250 represent the hydraulic connection between the pressure control valves 210, 212 and the hydraulic control piston 208.

Further in the control system, a pressure control function 214 in a controller provides current to the first and second pressure control valves 210, 212. The pressure control function 214 may be stored as instructions in memory of a controller such as the controller 194, described above with regard to FIG. 1. The pressure control function 214 receives inputs from pressure sensors 216, 218 designed to sense the pressure in hydraulic lines 220, 222, respectively. Lines 252, 254 represent the transfer of electronic signals between the pressure sensors 216, 218 and the pressure control function 214 as well as the transfer of control signals from the pressure control function to the pressure control valves 210, 212.

The control system 200 may be used during a transmission warm-up strategy to increase the pressure differential in the hydrostatic assembly 202. High pressure in the hydrostatic unit will provide a strong increase in power losses, significantly increasing the heat generation inside the gearbox. Specifics of the warm-up strategy are discussed in greater detail herein with regard to FIGS. 4-8.

Figure 3:
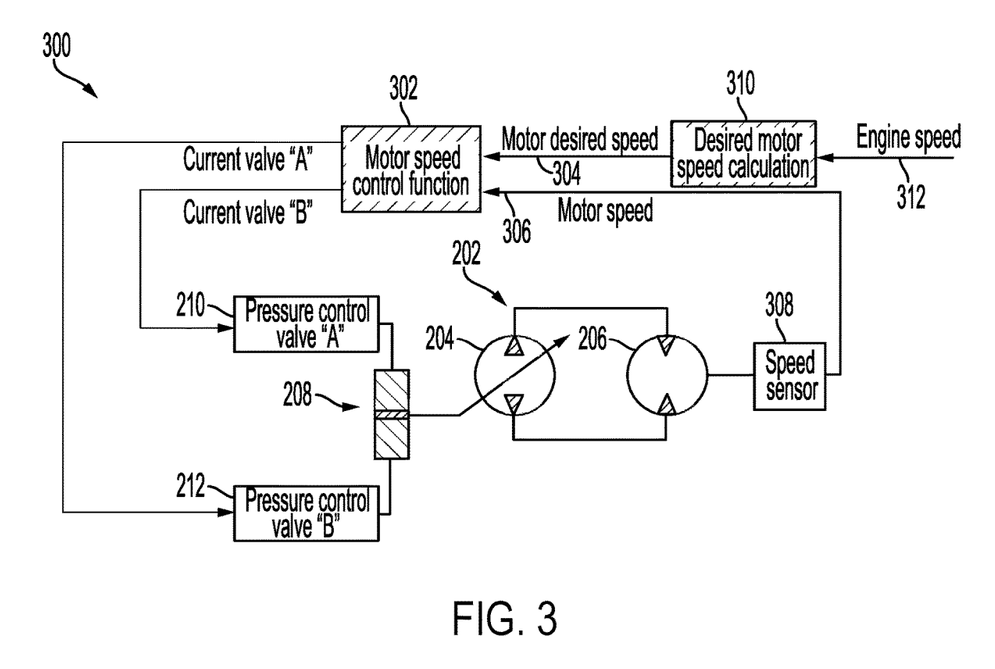

FIG. 3 depicts another control system 300 for the hydrostatic assembly 202 with the hydraulic pump 204 and the hydraulic motor 206. The control system 300 again includes the first and second pressure control valves 210, 212 that deliver pressurized fluid (e.g., oil) to chambers of the hydraulic control piston 208. It will be understood, that both control systems shown in FIGS. 2-3 may be used in the transmission system 100, depicted in FIG. 1. Redundant description of the overlapping control system components is omitted for brevity.

The control system 300 further includes a motor speed control function 302 that supplies current to the pressure control valves 210, 212. The motor speed control function 302 may be a software module stored in memory of a controller. The motor speed control function 302 may use desired motor speed 304 and sensed motor speed 306 as inputs. The motor speed 306 may be transferred from a motor speed sensor 308 coupled to the hydraulic motor 206. On the other hand, the desired motor speed 304 may be determined by a desired motor speed calculation module 310 which uses an engine speed 312 as an input.

The control system 300 may implement a warm-up approach by controlling the speed of the hydraulic motor 206 using pump displacement control. The desired speed may be automatically calculated based on the engine speed. A speed control function may provide the desired control current in valves 210, 212 to obtain the desired pump displacement which corresponds to the desired motor speed. The hydrostatic assembly may be operated in the speed control mode to synchronize clutches in the transmission, such as the forward and reverse clutches.

FIGS. 4-8 show a warm-up sequence for the transmission system 100 with the hydromechanical transmission 101. A rapid warm-up is achieved by increasing the pressure in the hydrostatic assembly 130. This elevated pressure correspondingly increases power losses and therefore increases heat generation in the transmission. It will be understood that the warm-up sequence depicted in FIGS. 4-8 is applicable to other transmissions that include at least one planetary gearset and at least two speed/torque sources.

Figure 4:
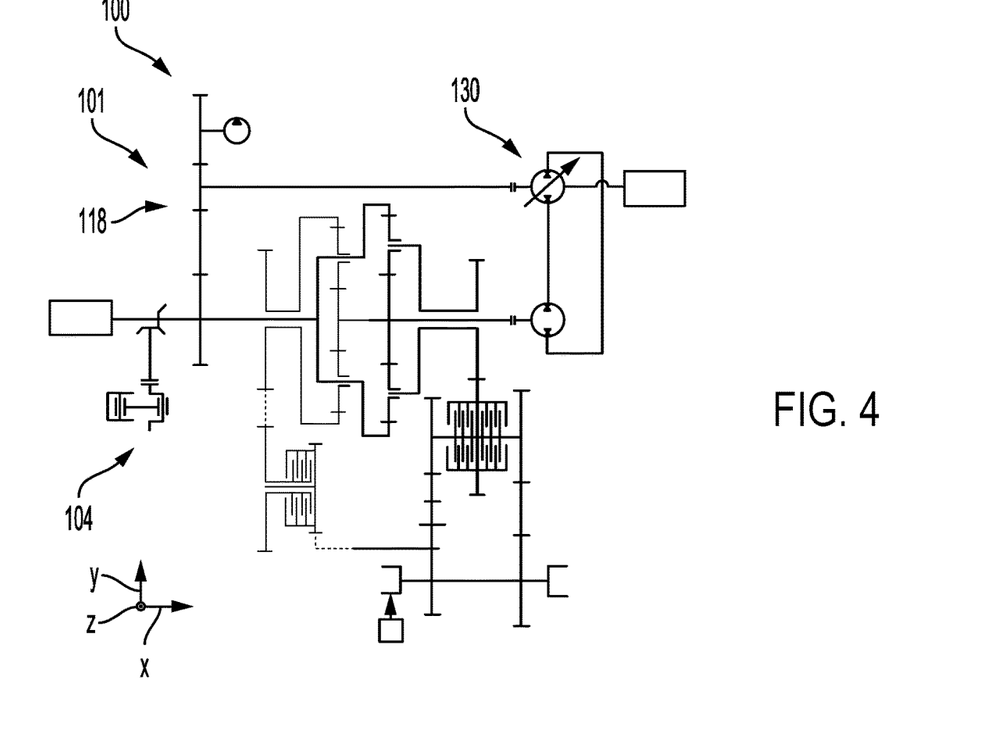
FIGS. 4-8 depict a warm-up sequence for the hydromechanical transmission system, illustrated in FIG. 1.
Figure 5:
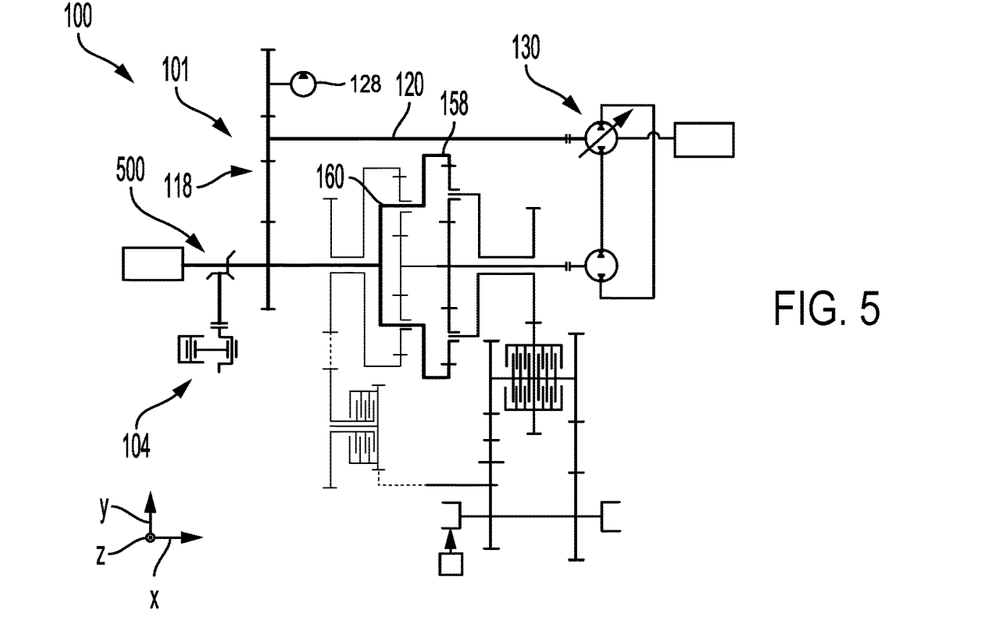

Turning specifically to FIG. 4, a first step in the warm-up sequence where the motive power source 104 (e.g., engine) is off is depicted. As such, the hydrostatic assembly 130 is depressurized and the mechanical assembly 118 is substantially stationary. Next, as illustrated in FIG. 5, cranking of the motive power source 104 initiates rotation of a portion of the mechanical assembly 118 and specifically the charging pump 128. In this way, the oil pressure in the transmission begins to increase. The mechanical power path during engine cranking is indicated at 500. Cranking of the engine may involve rotating the engine using a starter motor, for instance. Responsive to engine cranking, the carrier 160, the ring gear 158, and the shaft 120 in the mechanical assembly 118 begin to rotate.

Figure 6:
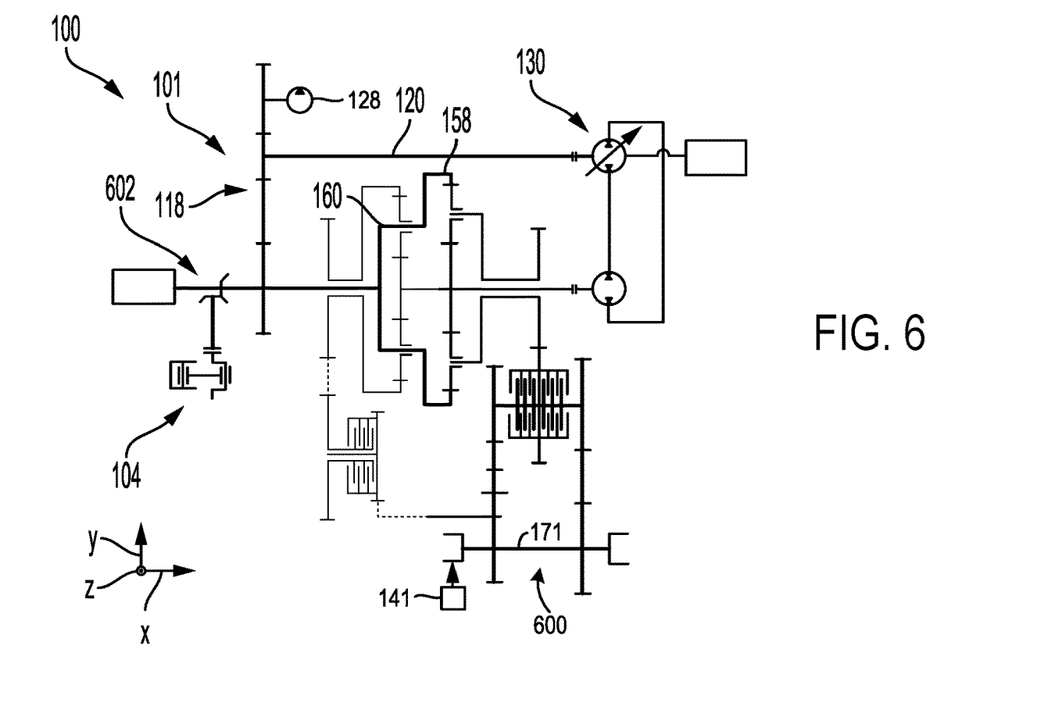

As shown in FIG. 6, the rotation of the output shaft 171 is inhibited through operation of the parking brake mechanism 141 as indicated at 600. While the parking brake mechanism 141 is engaged, the motive power source 104 continues to crank and induce rotation of the carrier 160, the ring gear 158, and the shaft 120 in the mechanical assembly 118 as indicated via mechanical power path 602. In FIG. 6, the charging pump 128 continues to receive rotational input and therefore increase in oil pressure continues while the parking brake mechanism blocks rotation of the output shaft 171.

Figure 7:
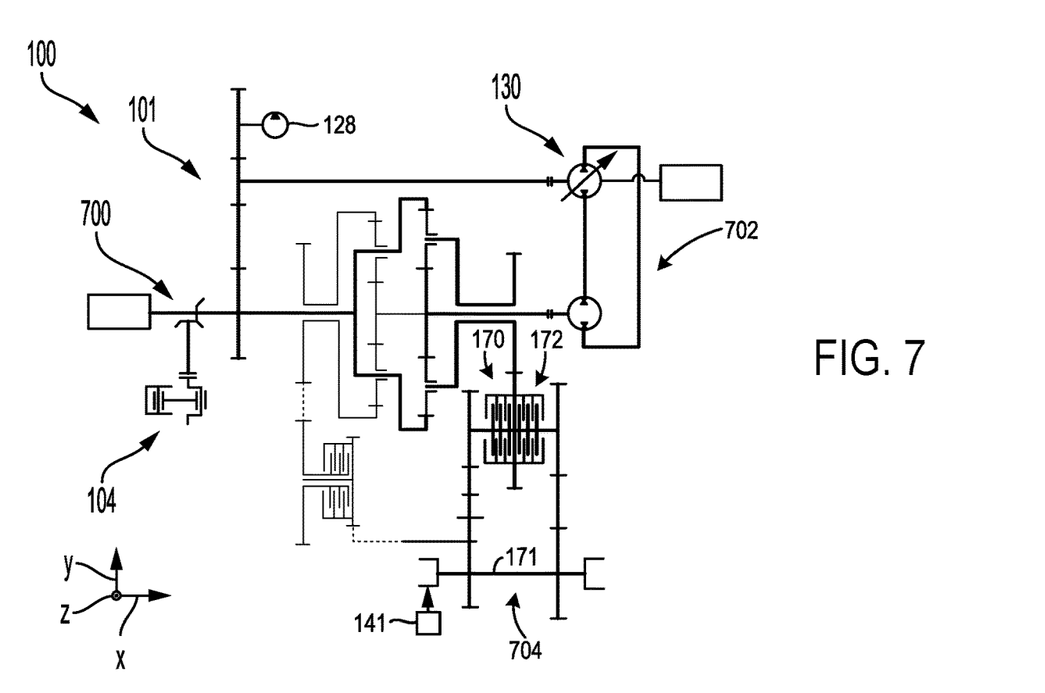

Next in the warm-up sequence, the hydrostatic assembly 130 is operated using a speed control function to achieve a desired motor speed set-point as shown in FIG. 7. For instance, the hydrostatic assembly may be operated using the control strategy depicted in FIG. 3. Operating the hydrostatic assembly in a speed control mode permits synchronization of the first forward drive clutch 172 and the reverse drive clutch 170. Further during this portion of the warm-up the parking brake mechanism continues to block movement of the output shaft 171 as indicated at 704. The mechanical power path 700 and the hydraulic power path 702 during this portion of the warm-up sequence are depicted in FIG. 7. As such, charging pump 128 continues to increase the pressure of the oil.

Figure 8:
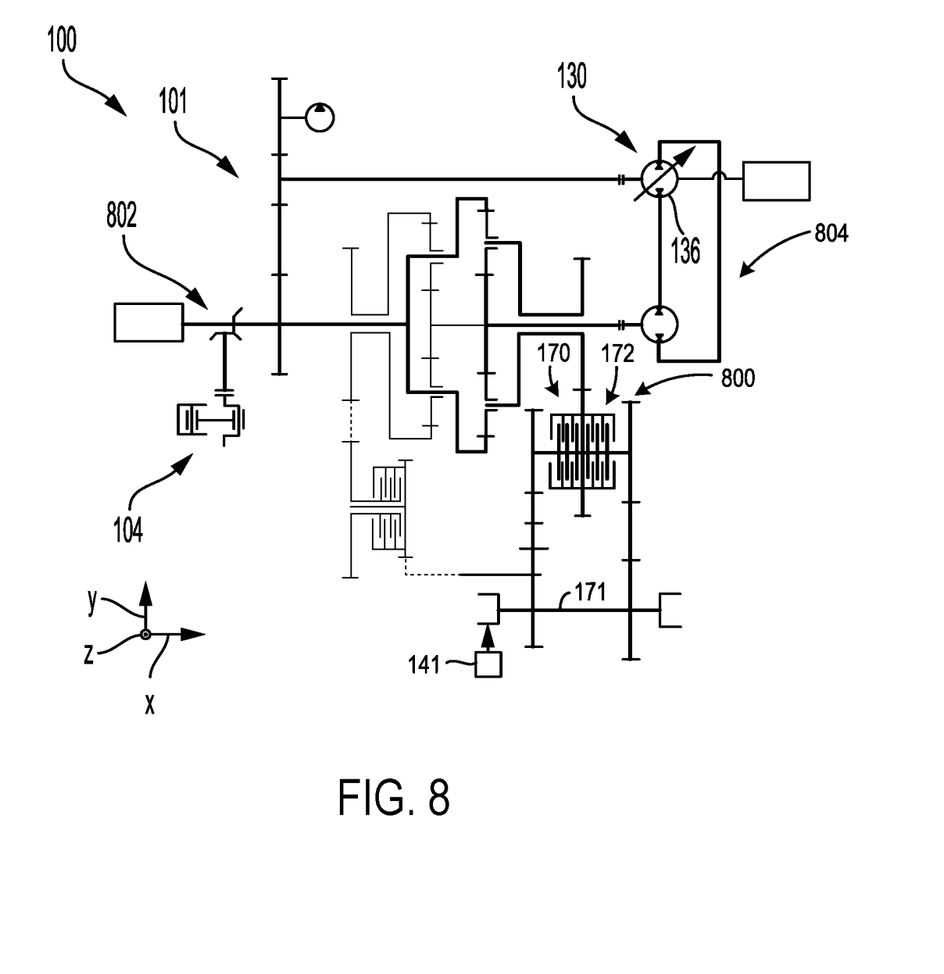

Once the clutches are synchronized, the clutches 170, 172 are engaged to place the transmission's output in a blocked condition, as shown at 800 in FIG. 8. Once the clutch blocking is achieved, the parking brake mechanism 141 may be released, if desired. However, in another example, parking brake engagement may be sustained. Subsequently, the hydrostatic assembly 130 is operated to increase the hydraulic pressure and reach a threshold temperature for the hydraulic fluid to initiate vehicle launch. The mechanical power path 802 and the hydraulic power path 804 through the transmission during this portion of warm-up are further shown in FIG. 8. In FIG. 8 the speed control of the hydraulic motor 136 may persist until vehicle launch is desired. During launch, the hydrostatic unit may be switched from the speed control mode to a torque control mode, where the hydraulic unit is controlled to follow a torque set-point of the motor. Conversely, in the speed control mode, the hydraulic unit is controlled to follow a speed set-point. Further, during launch the blocking condition of the clutches 170, 172 may be released. For instance, the reverse clutch may be release to allow the transmission to propel the vehicle in a forward drive direction. Switching from the speed control mode to the torque control mode in this manner enable the transmission's performance to be enhanced.

Figure 9:
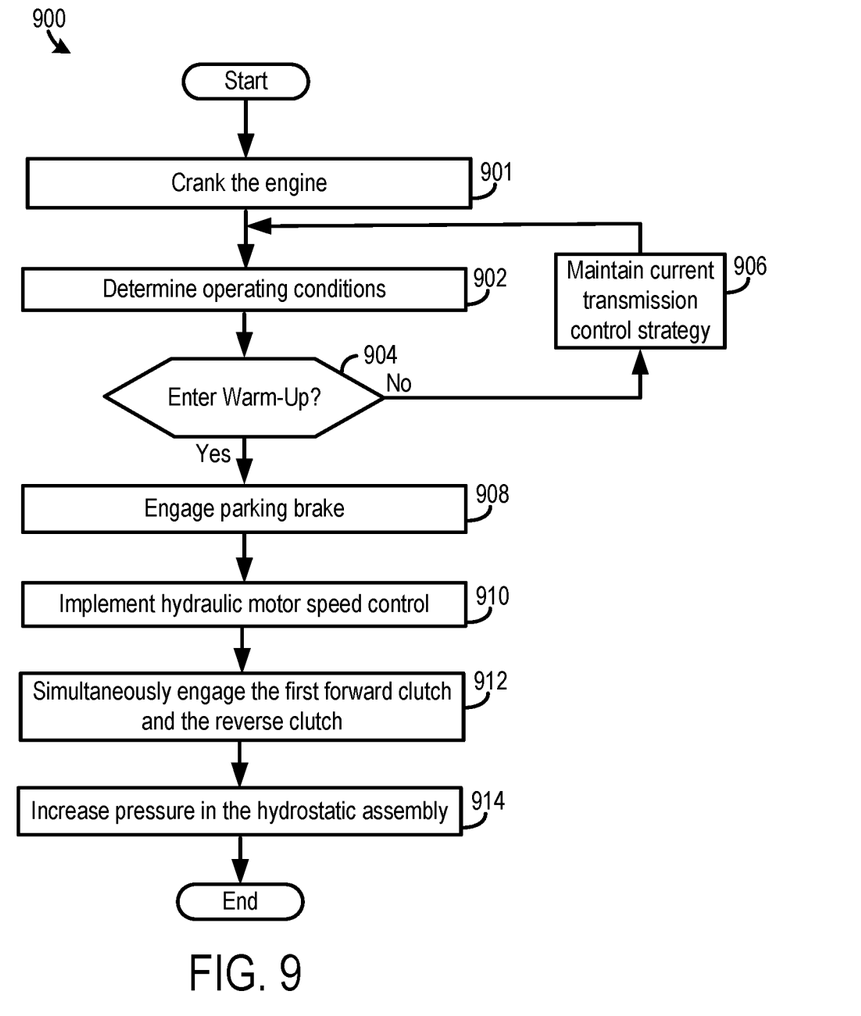
FIG. 9 is a method for operation of a hydromechanical transmission.

FIG. 9 shows a method 900 for operation of a hydromechanical transmission. The method 900 may be carried out by the transmission systems and components described above with regard to FIGS. 1-8, in one example. However, in other examples, the method 900 may be implemented using other suitable transmission systems and components. Further, the method may be carried out as instructions stored in memory executed by a processor in a controller. As such, performing the method steps may include receiving inputs from sensors and sending and/or receiving commands which trigger adjustment of associate components using actuators, as previously indicated.

At 901, the method includes cranking the engine. For instance, a starter motor may be used to crank the engine. Next at 902, the method includes determining operating conditions. The operating conditions may include engine speed, input device position (e.g., accelerator or brake pedal position), shift selector position, vehicle speed, and the like. The operating conditions may be ascertained via sensor inputs and/or modeling.

At 904, the method judges whether or not to initiate an engine warm-up sequence. This engine warm-up judgement may take into account input device position (e.g., accelerator pedal position, brake pedal positon, key position, and the like). For instance, the method may judge that warm-up should be initiated responsive to key-on and vice-versa.

If it is determined that warm-up should not be initiated (NO at 904) the method moves to 906 where the method includes maintaining the current transmission control strategy. For instance, the hydromechanical transmission may remain shut-down along with the engine in the powertrain.

Conversely, if it is determined that a warm-up sequence should be initiated (YES at 904) the method advances to 908 where the method includes engaging the parking brake to prevent rotation of the transmission's output shaft. For instance, the parking brake may be mechanically or hydraulically actuated via the controller. As such, step 908 may be automatically implemented. Alternatively, step 908 may be automatically implemented after engine cranking and prior to decision block 904. In such an example, the parking brake engagement may be sustained at step 908.

At 910, the method includes implementing speed control of the hydraulic motor. For example, the hydraulic pump's displacement may be adjusted to follow a target hydraulic motor speed reference. Specifically, a feedback control strategy may be used where the pump's displacement is adjusted using a control function that measures the deviation of the desired motor speed with a detected motor speed. The clutch may therefore be prepared for subsequent clutch blocking.

At 912, the method includes simultaneously engaging the first forward clutch and the reverse clutch to block the transmission's output. In this way, the clutches may be jointly closed to hold the transmission's output stationary. It will be appreciated that the method may further include sustaining engagement of the parking brake mechanism during engagement of the forward and reverse clutches. The parking brake engagement may be sustained subsequent to clutch engagement, in one example. In this way, the likelihood of unintended vehicle movement may be decreased due to the redundant braking of the transmission output. Alternatively, the parking brake may be disengaged subsequent to engagement of the forward and reverse clutches.

At 914, the method includes controlling the hydrostatic unit to achieve a desired pressure and oil temperature. Specifically, in one example, the hydrostatic unit may switch from speed control to torque control where the hydraulic motor is controlled to achieve a target oil pressure. In this way, transmission performance may be increased. Once a temperature set-point is reached, the hydrostatic unit may transition from the speed control mode to a torque control mode and vehicle launch may be initiated. Method 900 permits the fluid in the hydromechanical transmission to be rapidly warmed thereby increasing transmission longevity and reducing the likelihood of component degradation due to low oil temperatures.

The technical effect of the hydromechanical transmission systems and methods described herein is to decrease transmission warm-up time, when compared to previous warm-up methods, which decreases component wear and enhances transmission performance during cold vehicle starts, for instance.

FIGS. 1 and 4-8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a method for operation of a hydromechanical transmission is provided. The method includes responsive to rotation of a portion of a mechanical assembly induced by rotation of an engine or motor coupled to the hydromechanical transmission, blocking an output shaft of the hydromechanical transmission via joint engagement of a forward drive clutch and a reverse drive clutch, wherein the mechanical assembly is coupled in parallel with a hydrostatic assembly; and pressurizing the hydrostatic assembly while the forward drive clutch and the reverse drive clutch remain jointly engaged. In one example, the method may further comprise, prior to blocking the output shaft, operating the hydrostatic assembly in a speed control mode to synchronize the forward drive clutch and the reverse drive clutch. In yet another example, the method may further comprise, prior to joint engagement of the forward drive clutch and the reverse drive clutch, engaging a parking brake mechanism coupled to the output shaft; and subsequent to joint engagement of the forward drive clutch and the reverse drive clutch, disengaging the parking brake mechanism.

In another aspect, a hydromechanical transmission is provided that comprises a mechanical assembly including a planetary gearset; a hydrostatic assembly coupled in parallel with the mechanical assembly; a forward drive clutch and a reverse drive clutch coupled to the mechanical assembly and an output shaft; a controller comprising: instructions that when executed while the mechanical assembly is receiving rotational input from a motive power source, cause the controller to: block the output shaft of the hydromechanical transmission via joint engagement of the forward drive clutch and the reverse drive clutch, wherein the mechanical assembly is coupled in parallel with the hydrostatic assembly; and pressurize the hydrostatic assembly while the forward drive clutch and the reverse drive clutch remain jointly engaged.

In yet another aspect, a warm-up method for a hydromechanical transmission is provided that comprises responsive to rotation of a portion of a mechanical assembly induced by cranking of an engine, operating a hydrostatic assembly in a speed control mode to synchronize a forward drive clutch and a reverse drive clutch, wherein the forward drive clutch and the reverse drive clutch are coupled to the mechanical assembly and wherein the mechanical assembly is coupled in parallel with the hydrostatic assembly; blocking an output shaft of the hydromechanical transmission via joint engagement of the forward drive clutch and the reverse drive clutch; and pressurizing the hydrostatic assembly while the forward drive clutch and the reverse drive clutch remain jointly engaged. The method may further comprise, prior to and during synchronization of the forward drive clutch and the reverse drive clutch, initiating and sustaining engagement of a parking brake mechanism coupled to the output shaft. The method may further comprise, in one example, subsequent to blocking the output shaft, disengaging or sustaining engagement of the parking brake mechanism.

In any of the aspects or combinations of the aspects, the hydrostatic assembly may include a hydraulic pump and a hydraulic motor; and pressurizing the hydrostatic assembly may include operating a hydraulic control piston to adjust displacement of the hydraulic pump.

In any of the aspects or combinations of the aspects, pressurizing the hydrostatic assembly may include increase a pressure differential between hydraulic lines coupled to the hydraulic pump and the hydraulic motor.

In any of the aspects or combinations of the aspects, the controller may comprise: instructions that when executed, while the mechanical assembly is receiving rotational input from the engine or motor, cause the controller to: adjust a hydraulic pump in the hydrostatic assembly to achieve a target pump displacement that corresponds to a speed of a hydraulic motor in the hydrostatic assembly.

In any of the aspects or combinations of the aspects, the forward drive clutch and the reverse drive clutch may be coupled to a carrier of the planetary gearset.

In any of the aspects or combinations of the aspects, the forward drive clutch and the reverse drive clutch may be coaxially arranged.

In any of the aspects or combinations of the aspects, the hydromechanical transmission may further comprise a parking brake mechanism coupled to the output shaft and wherein the controller comprises: instructions that when executed, prior to the joint engagement of the forward drive clutch and the reverse drive clutch, cause the controller to: engage the parking brake mechanism.

In any of the aspects or combinations of the aspects, the first forward drive clutch and the reverse drive clutch may be friction clutches.

In any of the aspects or combinations of the aspects, the first forward drive clutch and the reverse drive clutch may be coaxially arranged.

In any of the aspects or combinations of the aspects, the transmission may further comprise a second forward drive clutch axially offset from the first forward drive clutch.

In any of the aspects or combinations of the aspects, the method may further comprise switching from the speed control mode to a torque control mode subsequent to disengagement of the forward drive clutch and reverse drive clutch.

In any of the aspects or combinations of the aspects, the method may further comprise switching from the speed control mode to a torque control mode subsequent to disengagement of the forward drive clutch and reverse drive clutch.

In any of the aspects or combinations of the aspects, the method may further comprise prior to the joint engagement of the forward drive clutch and the reverse drive clutch, engaging a parking brake mechanism coupled to the output shaft.

In any of the aspects or combinations of the aspects, the hydrostatic assembly may include a hydraulic pump and a hydraulic motor and pressurizing the hydrostatic assembly may include operating a hydraulic control piston to adjust displacement of the hydraulic pump; and pressurizing the hydrostatic assembly may include increasing a pressure differential between hydraulic lines coupled to the hydraulic pump and the hydraulic motor.

In any of the aspects or combinations of the aspects, the forward drive clutch and the reverse drive clutch may be hydraulically operated and coaxially arranged.

In another representation, a hydromechanical variable transmission (HVT) is provided that, in one example, comprises a hydrostatic unit coupled in parallel with a mechanical branch that includes a planetary gearset coupled to coaxially arranged forward and reverse drive clutches. The HVT further includes a controller that comprises instructions that when executed, during cranking of an engine coupled to the mechanical branch, cause the controller to synchronously engage the forward and reverse drive clutch and increase a pressure differential in the hydrostatic unit via adjustment of a displacement of a hydrostatic pump in the hydrostatic unit.

Note that the example control and estimation routines included herein can be used with various transmission and/or powertrain configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle and/or transmission control system, where the described actions are carried out by executing the instructions in a system including the various hardware components in combination with the electronic controller. One or more of the method steps described herein may be omitted if desired.

While various embodiments have been described above, it should be understood that they have been presented by way of example, and not limitation nor restriction. It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein. It will be apparent to persons skilled in the relevant arts that the disclosed subject matter may be embodied in other specific forms without departing from the spirit of the subject matter.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A hydromechanical variable transmission (HVT) comprising:
   a hydrostatic unit coupled in parallel with a mechanical branch;
   wherein the mechanical branch includes a first planetary gear set that is coupled to a forward drive clutch and a reverse drive clutch;
   a parking brake mechanism coupled to an output shaft; and
   a controller that comprises:
      instructions that when executed, during cranking of an engine coupled to the mechanical branch, cause the controller to:
         synchronously engage the forward drive clutch and the reverse drive clutch; and
         increase a pressure differential in the hydrostatic unit via adjustment of a displacement of a hydraulic pump in the hydrostatic unit; and
      instructions that when executed, subsequent to the synchronous engagement of the forward drive clutch and the reverse drive clutch, cause the controller to:
         disengage the parking brake mechanism.

2. The HVT of claim 1, wherein the controller further comprises:
   instructions that when executed, prior to engagement of the forward drive clutch and the reverse drive clutch, cause the controller to:
      operate the hydrostatic unit in a speed control mode to synchronize the forward drive clutch and the reverse drive clutch.

3. The HVT of claim 1, further comprising a second planetary gear set rotationally coupled to the first planetary gear set.

4. The HVT of claim 3, wherein the second planetary gear set is a simple planetary gear set.

5. The HVT of claim 1, wherein the HVT is configured to rotationally couple to the engine.

6. The HVT of claim 1, wherein the forward drive clutch and the reverse drive clutch are friction clutches.

7. The HVT of claim 1, wherein the hydrostatic unit includes a hydraulic motor.

8. The HVT of claim 1, wherein the forward drive clutch and the reverse drive clutch are synchronously engaged during cranking of an internal combustion engine that is coupled to the HVT.

9. The HVT of claim 1, wherein the forward drive clutch and the reverse drive clutch are coaxially arranged.

10. The HVT of claim 1, further comprising an output shaft rotationally coupled to multiple drive axles.

11. A method for operation of a hydromechanical variable transmission (HVT), comprising:
    synchronously engaging a forward drive clutch and a reverse drive clutch;
    increasing a pressure differential in a hydrostatic unit via adjustment of a displacement of a hydraulic pump in the hydrostatic unit; and
    subsequent to the synchronous engagement of the forward drive clutch and the reverse drive clutch, disengaging a parking brake mechanism coupled to an output shaft;
    wherein the HVT includes:
       the hydrostatic unit coupled in parallel with a mechanical branch;
    wherein the mechanical branch includes a planetary gear set that is coupled to the forward drive clutch and the reverse drive clutch; and
    wherein the forward drive clutch and the reverse drive clutch are coaxially arranged.

12. The method of claim 11, further comprising, prior to the synchronous engagement of the forward drive clutch and the reverse drive clutch, operating the hydrostatic unit in a speed control mode to synchronize the forward drive clutch and the reverse drive clutch.

13. A transmission system, comprising:
    a first planetary gear set;
    a hydrostatic assembly coupled in parallel with the first planetary gear set;
    a forward drive clutch and a reverse drive clutch coupled to the first planetary gear set and an output shaft;
    a parking brake mechanism coupled to the output shaft; and
    a controller comprising:
       instructions that when executed, while the first planetary gear set is receiving rotational input from a motive power source, cause the controller to:
          block the output shaft of the transmission system via joint engagement of the forward drive clutch and the reverse drive clutch; and
          pressurize the hydrostatic assembly while the forward drive clutch and the reverse drive clutch remain jointly engaged; and
       instructions that when executed, prior to the joint engagement of the forward drive clutch and the reverse drive clutch, cause the controller to:
          engage the parking brake mechanism; and
       instructions that when executed, subsequent to the joint engagement of the forward drive clutch and the reverse drive clutch, cause the controller to:
          disengage the parking brake mechanism.

14. The transmission system of claim 13, wherein the motive power source is an internal combustion engine.

15. The transmission system of claim 13, wherein the output shaft is coupled to a drive axle.

\* \* \* \* \*